April 26, 1960 J. A. McLENNAN 2,934,379
COMBINED FLY ASH AND BOTTOM ASH HANDLING SYSTEM
Filed Oct. 31, 1958 3 Sheets-Sheet 1

INVENTOR.
JAMES A. McLENNAN
BY
RICHEY, WATTS, EDGERTON,
McNENNY & FARRINGTON
ATTORNEYS

April 26, 1960 J. A. McLENNAN 2,934,379
COMBINED FLY ASH AND BOTTOM ASH HANDLING SYSTEM
Filed Oct. 31, 1958 3 Sheets-Sheet 2

INVENTOR.
JAMES A. McLENNAN

BY
RICHEY, WATTS, EDGERTON,
McNENNY & FARRINGTON
ATTORNEYS

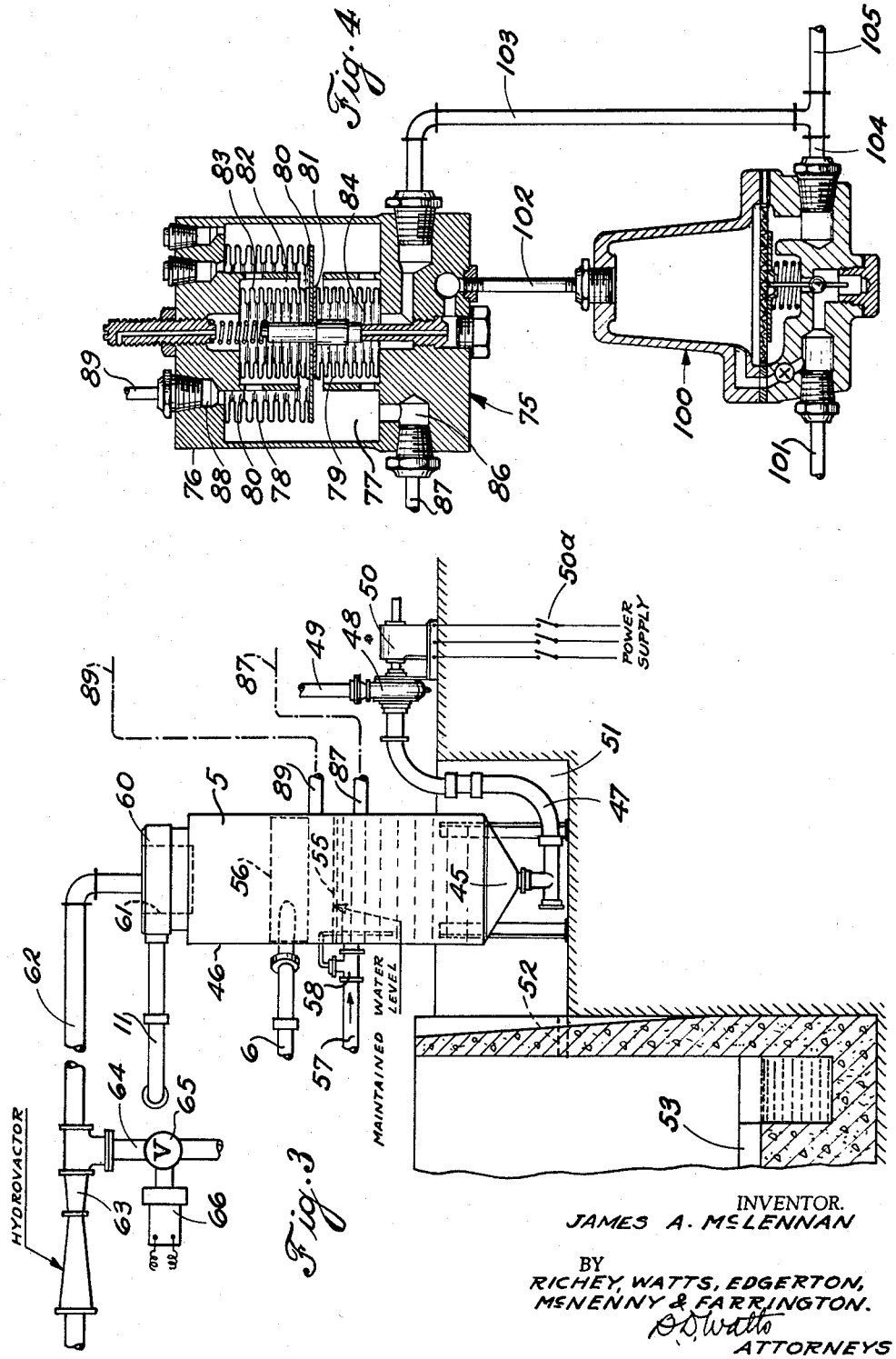

United States Patent Office 2,934,379
Patented Apr. 26, 1960

2,934,379

COMBINED FLY ASH AND BOTTOM ASH HANDLING SYSTEM

James A. McLennan, Birmingham, Ala., assignor to The Allen-Sherman-Hoff Company, Wynnewood, Pa., a corporation of Pennsylvania Application October 31, 1958, Serial No. 771,114

6 Claims. (Cl. 302—15)

This invention relates generally to the art of handling solids and is more particularly concerned with new apparatus for use in simultaneously conducting into a sump ash in dust form by vacuum means and larger pieces of ash, i.e., bottom ash, by hydraulic means and discharging mixtures of the dust and bottom ash from the sump.

Heretofore ashes in the form of large solids, known as bottom ash, such as pass from a furnace combustion chamber into an ash hopper usually through a clinker grinder, have been transported hydraulically from the ash hopper to a pit, tank or place where fill material is desired. Apparatus operating in this manner is disclosed in Allen Patent No. 1,943,780.

Ash in the form of fine, dry dust, such as is carried out of the combustion chamber with the gases and has been collected in dust hoppers, has been transported pneumatically through a conduit to a cyclone separator. Apparatus operating in this manner is disclosed in Allen Patent No. 2,420,217.

The conditions existing in the bottom ash handling apparatus are different from those existing in the dry dust handling apparatus. In the former apparatus, the tank was provided with drains in its side walls to permit rapid removal of water entering with the ash. If fine ash were discharged into the water in the tank, it would escape with the escaping water and might tend to plug up the escape pipe line.

In the latter apparatus, a relatively high degree of vacuum was created and maintained in the cyclone separator to induce a continued flow of the dry dust from the collecting hopper into the separator. The conduit had to be kept dry to prevent the dust from clinging thereto and partially or completely closing the passage through the conduit. Since opening the separator to remove dust therefrom would destroy the vacuum and stop the flow of dust into the separator, the dust could not be removed from the separator while the dust was entering the separator unless rather elaborate means was used to maintain the vacuum during the removal of the dust.

There are numerous long and well known advantages and economies which could have been realized if the two foregoing apparatuses or systems could have been combined and operated simultaneously. For example, if the dry dust, bottom ash and the water could be discharged into a single receptacle, one of the previously used pits or tanks could be eliminated and the other one made to do double duty and both types of ash could be discharged at the same time from the separator without interrupting the flow of the dry dust into the separator since the water in the lower part of the separator would prevent ingress of air. One pipe line and one pump would serve to transport both types of ash to a place of disposal, for example, a fill. The simultaneous delivery of both types of ash into the separator as well as the concurrent removal of the ashes from the separator would economize the time and attention of the operator and greatly reduce the time required where each type of ash was handled separately.

An important advantage traceable to the use of a single pipe line for both types of ash with water is that by combining them and passing them through a pipe at a high velocity the dust ash will mix with the water to form a slurry which will carry the bottom ash in suspension and clear of the pipe, thus avoiding the abrasive wear due to sliding the bottom ash along the pipe as occurred when water alone was used. In lines handling fly or dust ash only, there is a tendency for the dust to collect in bodies resembling scale. When the dust and coarse ash are passed through the same pipe, the coarse ash acts to prevent the accumulation of such scale.

So far as I know, no one has ever proposed a combination of those two prior apparatuses which would have been satisfactory. It was not obvious to one of ordinary skill in the art how to combine those apparatuses into an apparatus as is indicated by the fact that they have never been combined, although it has long been known that the foregoing advantages and economies could have been realized from a satisfactory combination thereof.

The foregoing, and other, advantages, will be apparent from the following description taken in connection with the accompanying drawings, wherein are set forth by way of illustration and example, certain embodiments of this invention.

The present invention realizes the foregoing advantages and economies by providing a new combination of elements which has a new mode of operation and gives new results.

Briefly described, the present invention is embodied in one form of apparatus which comprises a single closed tank or sump, means for hydraulically discharging water and bottom ash into an intermediate part of the sump, pneumatic means for pneumatically discharging dry dust into the sump above the surface of water therein, means for removing a mixture of dust, bottom ash and water from the lower part of the sump and means for automatically maintaining the surface of the water in the sump within predetermined limits. In a preferred form of apparatus the means used for maintaining the surface level of the water is responsive to the variations in the differential pressure at two vertically spaced places in the sump.

In the drawings accompanying and forming a part of this specification:

Fig. 3 is an enlarged side elevational view taken on line 3—3 of Fig. 1 and showing the sump of Fig. 1 and associated parts; and Fig. 4 is a vertical cross-sectional view of the differential pressure device of Figs. 1 and 2.

Figure 1:
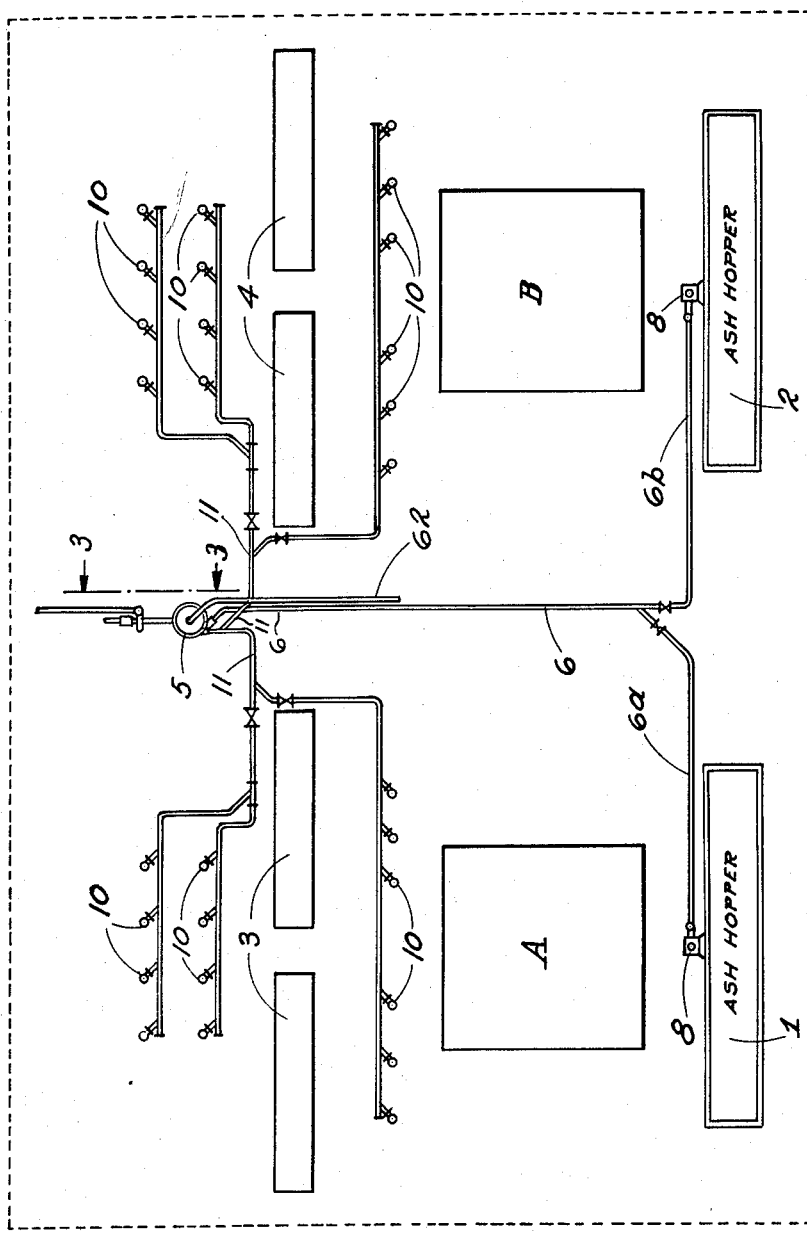
Fig. 1 is a diagrammatic plan view of one form of apparatus embodying the present invention and employed in connection with two sets of boilers of a power plant.

Fig. 1 shows diagrammatically, in plan view, two boilers equipped with apparatus embodying the present invention. The boilers A and B are provided with bottom ash hoppers 1 and 2 to receive bottom ash and with dust hoppers 3 and 4 in which fly or dust ash is collected after being carried out of the combustion chamber by the gases on their way to the stacks. A tank or sump 5 is connected by pipe line 6 and branch lines 6a and 6b to hoppers 1 and 2, respectively, through a device 8 for receiving ash discharged from the hoppers and hydraulically transporting it through the pipes to sump 5.

Wind-swept dust valves 10 are connected with dust hoppers 3 and 4 to receive finely divided dust therefrom and are connected to sump 5 through pipe lines 11. Valves suitable for this purpose are shown in Figs. 1 to 7 of Patent No. 2,534,807. Such a valve comprises a body attached to the bottom of a hopper and having a vertical chamber through which the dust may fall, a lateral outlet to which a source of vacuum may be applied and an inlet for air opposite the outlet and through which air may be drawn when vacuum is applied through the outlet from the chamber.

Figure 2:
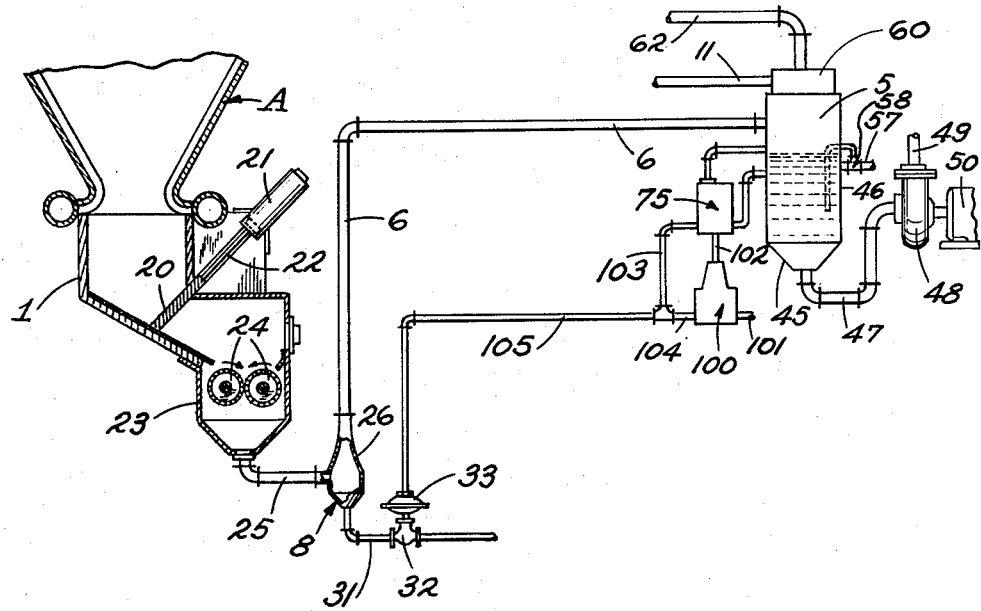
Fig. 2 is a diagrammatic side elevational view of part of the apparatus shown in Fig. 1.

A suction-creating device or ejector, commonly known as a hydrovactor and shown in Fig. 2 of Patent No. 1,943,780, can be used as the exhauster. If preferred, a suitable blower may be used. Such a blower would have its air intake connected to sump 5 and be protected by a suitable filter or, in turn, connected to the sump 5 and would serve to exhaust the air in the washer, sump lines 11 and valves 10 to create a vacuum therein of about 7" of mercury.

Referring now more particularly to Figs. 2 and 3, it will be seen that the boiler A has an ash hopper 1 disposed therebeneath to receive the ash which normally falls from the combustion chamber to the furnace. This hopper is provided with a gate 20 which may be operated automatically in any suitable manner but, as shown, by means of fluid pressure admitted into cylinder 21 to exert force on a piston therein (not shown) and connected to the gate by means of a piston rod 22. A supplemental hopper 23 may be provided and may be equipped with clinker grinders 24 to reduce the ash to a size small enough to be transported through pipe line 6 which has a convenient size such as eight inches in diameter.

Water may be supplied to hopper 23 and even to hopper 1, if desired, and such water will serve to carry bottom ash from hopper 23 through pipe 25.

Means 8 is shown in Fig. 2 for transporting bottom ash from adjacent to hopper 23 to sump 5. This means includes pipe line 6 and a propelling device positioned to receive the ash from pipe 25. Means 8, as shown in Fig. 2, includes an enlargement 26 in pipe 6 into which pipe 25 opens and a high pressure water line 31 which opens into the enlargement in advance of or below the outlet end of pipe 25. Pipe line 31 is provided with a valve 32 which is controlled by a diaphragm device 33 and this device is, in turn, controlled by differences in pressure as sensed by a differential pressure means presently to be described.

The sump 5 is shown in Figs. 2 and 3. This sump, in the illustrated form, is a cylindrical tank having a sloping bottom 45 and vertical side walls 46 with a pipe line 47 leading from an opening in the central part of the wall 45 to a centrifugal pump 48 which discharges into an outlet pipe 49 and through which solid and liquid materials from sump 5 may be pumped to any desired place of disposal. A motor for actuating pump 48 is indicated at 50. This motor is electrically energized when switch 50a is closed.

In Fig. 3 the sump 5 is shown as being partly located in a well 51 adjacent to and above the basement floor. Any liquid which collects in the well may flow out through drain 52 to any convenient disposal means which, as illustrated, is an overflow trench 53 located in the basement floor and leading to the plant waste sump in the basement.

The main pipe line 6 for bottom ash is indicated as entering the sump 5 through the side wall 46 above the water level therein which is indicated at 55. Preferably the pipe 6 enters the sump 5 tangentially and, since the solids which are passing through pipe 6 are abrasive, it is preferable to protect the interior surface of the walls 46 by some suitable means, for example, by a metal band 56 of suitable vertical length positioned in the zone of the discharge end of pipe 6. Water may be supplied to the interior of sump 5 through a pipe line 57 which is equipped with a control valve 58 actuated by the surface level of water in the tank.

A cyclone separator 60 is located at the top of sump 5 and is of any well known type. As shown it includes an inner cylindrical wall 61. Dust or fine ash flowing through line 11 enters tangentially into the space between the outer wall of separator 60 and the axial depending wall 61. The air carrying these fine solids flows around this wall and downwardly to below its lower edge. There the air reverses its direction and moves upwardly and out through the top of separator 60 through pipe line 62. Most of the dust and fine solids flowing into separator 60 continue on downwardly when the air changes direction, as just described, and such dust collects in the water in the sump.

Pipe line 62 leads from the top of sump 5 within wall 61 to hydrovactor 63 and a pipe line 64 provided with a valve 65 serves to control the admission of fluid under pressure into the hydrovactor to create a vacuum in the sump 5. Valve 65 may be actuated electrically through switch 66.

In Fig. 2 there is shown a differential pressure sensing means indicated generally at 75 and in some detail in Fig. 4. This device 75 includes a body 76 which has three chambers. The outer chamber 77 is partly defined by bellows 78 and 79 and plates 80 and 81 connected thereto. The second chamber 82 is located inside of bellows 78 and is partly defined by bellows 78, plate 81 and bellows 83. The third chamber 84 is partly defined by bellows 79 and plate 81 connected to one end thereof. Chamber 77 is connected through passage 86 and pipe 87 to the interior of sump 5 some distance below the predetermined level of the surface of water therein. The second chamber 82 is connected through a passage 88 to pipe 89 and this pipe is connected to the interior of sump 5 a short distance above the predetermined surface level of the water therein.

A pilot valve 100 is connected through pipe 101 to a source of fluid supply (not shown) and through pipe 102 to the interior of the third chamber 84 of pressure sensing means 75. Chamber 84 is connected through outlet pipe 103 to the interior of valve 100 through pipe 104 and to the diaphragm device 33 through pipe 105.

The operation of the apparatus of Figs. 2, 3 and 4 is substantially as follows:

When it is desired to remove dust and bottom ash from the hoppers of furnace A or B, the hydrovactor 63 is actuated by opening a valve 65 whereupon the hydrovactor exhausts air from sump 5 through line 62 above the water level and pipe 11. When the pressure is reduced to a predetermined value, the outlet of one of the dust valves 10 is automatically and sequentially opened, whereupon air flows into the dust-containing chamber of the valve, there entrains dust and carries the dust to sump 5. Substantially all the dust is separated from the air in sump 5 and collects in the water in the lower part thereof. This automatic operation of the valves 10 is substantially as disclosed in Patent No. 2,534,807.

At or about the same time that hydrovactor 63 is actuated, a switch 50a is closed which results in starting motor 50 and actuating pump 48. Thereupon water is removed from sump 5 and its surface is lowered. When the hopper A is provided with a door, such as is shown at 20 in Fig. 2 and clinker grinders 24, the door is opened and the grinders are started either automatically or manually.

As the water level in sump 5 falls, the difference in the pressure existing in lines 87 and 89 causes the pressure sensing device 75 to exert an increased pressure through pipe line 105 and thereby open valve 32, whereupon water under high pressure flows into pipe 31 and thence through means 8 and to the sump 5 through line 6. In passing through means 8, bottom ash from hopper 23 and pipe 25 is received by the water flowing through means 8 and thus the bottom ash is transported into sump 5.

The surface level of the water in sump 5 will vary during the operation of removing dust and bottom ash from the hoppers and, as it varies, the valve 32 will be varied correspondingly so that in normal operation the surface level of the water will be maintained between the outlets of pipes 87 and 89. The level control valve 58 in line 57 will operate automatically to prevent the level of the water from falling substantially below the end of pipe 87 and the outlet end of pipe 89 is maintained far enough above its communication with the interior of sump 5 to prevent water flowing into the pressure sensing device 75. It will be noted that the inlet end of dust carrying pipe 11 is far above the water level in sump 5 and that hence there is little, if any, chance that water will get into that pipe so as to cause stoppage thereof.

It will be understood that the several valves 10 are actuated one at a time automatically. As soon as one valve has removed substantially all the dust from its hopper, the air pressure in the system will increase due to the ingress of air into the valve whereupon the outlet end of the valve will be automatically closed and, after the pressure in the system has been reduced to the predetermined amount, the next valve 10 will open and the foregoing operation will be repeated. When the dust has been removed from each of the valves 10, the blower 48 will be de-energized.

When substantially all the bottom ash has been removed from hopper 23, the motor 50 is de-energized.

Having thus described this invention in such full, clear, concise and exact terms as to enable any person skilled in the art to which it pertains to make and use the same, and having set forth the best mode contemplated of carrying out this invention, I state that the subject-matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. Ash handling apparatus comprising a sump having an air outlet in its top and a circumferentially continuous wall depending from the inner side of the top of the sump around said outlet, a conduit extending from a dry dust hopper and opening tangentially into the upper part of the sump outside of said depending wall and above its lower edge, pneumatic means for inducing a flow of air out of the sump through said outlet and thereby causing air and dry dust to flow from said hopper through said conduit and into said sump around said wall, a pipeline extending from adjacent to an ash hopper and opening tangentially into the sump below the lower end of the depending wall, hydraulic means for causing ash and waer to flow through said pipeline and into and around said sump, means for removing a mixture of water and ashes of large and small sizes from the lower part of the sump, and means for maintaining the surface level of water in the sump below the entry of the pipeline thereinto.

2. Ash handling apparatus comprising a sump having an air outlet in its top and a circumferentially continuous wall depending from the inner side of the top of the sump around said outlet, a conduit extending from a dry dust hopper and opening tangentially into the upper part of the sump outside of said depending wall and above its lower edge, pneumatic means for inducing a flow of air out of the sump through said outlet and thereby causing air and dry dust to flow from said hopper through said conduit and into said sump around said wall, a pipeline extending from adjacent to an ash hopper and opening tangentially into the sump below the lower end of the depending wall, hydraulic means for causing ash and water to flow through said pipeline and into and around said sump, means for removing a mixture of water and ashes of large and small sizes from the lower part of the sump, and means responsive to variations in differential pressure in the sump to vary the rate of flow of water through said pipeline.

3. Ash handling apparatus comprising a sump having an air outlet in its top and a circumferentially continuous wall depending from the inner side of the top of the sump around said outlet, a conduit extending from a dry dust hopper and opening tangentially into the upper part of the sump outside of said depending wall and above its lower edge, pneumatic means for inducing a flow of air out of the sump through said outlet and thereby causing air and dry dust to flow from said hopper through said conduit and into said sump around said wall, a pipeline extending from adjacent to an ash hopper and opening tangentially into the sump below the lower end of the depending wall, hydraulic means for causing ash and water to flow through said pipeline and into and around said sump, means for removing a mixture of water and ashes of large and small sizes from the lower part of the sump, means for maintaining the surface level of water in the sump below the entry of the pipeline thereinto and means responsive to variations in differential pressure in the sump to vary the rate of flow of water through said pipeline.

4. Ash handling apparatus comprising a sump having an air outlet in its top and a circumferentially continuous wall depending from the inner side of the top of the sump around said outlet, a conduit extending from a dry dust hopper and opening tangentially into the upper part of the sump outside of said depending wall and above its lower edge, means for creating a predetermined degree of vacuum in said sump and conduit and thereby inducing the flow of air and dry dust from said hopper through said conduit and into said sump, a pipeline extending from adjacent to an ash hopper and opening tangentially into the sump below the entry of the conduit into the sump, means for discharging water into said pipeline at above a predetermined volume and thereby controllably moving ash and water through said pipeline and into said sump, means for removing a mixture of water and ashes of large and small sizes from the lower part of the sump, means responsive to the degree of vacuum in the sump to control the rate of flow of said mixture out of the sump, and means for maintaining the surface level of water in the sump below the entry of the pipeline thereinto.

5. Ash handling apparatus comprising a sump having an air outlet in its top and a circumferentially continuous wall depending from the inner side of the top of the sump around said outlet, a conduit extending from a dry dust hopper and opening tangentially into the upper part of the sump outside of said depending wall and above its lower edge, means for creating a predetermined degree of vacuum in said sump and conduit and inducing the flow of air and dry dust from said hopper through said conduit and into said sump, a pipeline extending from adjacent to an ash hopper and opening tangentially into the sump below the lower end of the depending wall, means for discharging water into said pipeline at above a predetermined volume and thereby controllably moving ash and water through said pipeline and into said sump, means for removing a mixture of water and ashes of large and small sizes from the lower part of the sump, and means responsive to variations in differential pressure in the water in the sump to vary the rate of flow of water through said pipeline.

6. Ash handling apparatus comprising a sump having an air outlet in its top and a circumferentially continuous wall depending from the inner side of the top of the sump around said outlet, a conduit extending from a dry dust hopper and opening tangentially into the upper part of the sump outside of said depending wall and above its lower edge, means for creating a predetermined degree of vacuum in said sump and conduit and thereby inducing the flow of air and dry dust from said hopper through said conduit and into said sump, a pipeline extending from adjacent to an ash hopper and opening tangentially into the sump below the entry of the conduit into the sump, means for discharging water into said pipeline at above a predetermined volume and thereby controllably moving ash and water through said pipeline and into said sump, means for removing a mixture of water and ashes of large and small sizes from the lower part of the sump, means responsive to the degree of vacuum in the sump to control the rate of flow of said mixture out of the sump, means for maintaining the surface level of water in the sump below the entry of the pipeline thereinto, and means responsive to variations in differential pressure in the water in the sump to vary the rate of flow of water through said pipeline.

References Cited in the file of this patent

UNITED STATES PATENTS

| | | |
|---|---|---|
| 2,344,347 | Foresman | Mar. 14, 1944 |
| 2,370,207 | Thorsten | Feb. 27, 1945 |
| 2,430,278 | Daniels | Nov. 4, 1947 |
| 2,486,650 | Hepp | Nov. 1, 1949 |